F. H. PIERPONT.
STRIP PERFORATING AND WINDING MACHINE.
APPLICATION FILED JULY 17, 1906.

980,997.

Patented Jan. 10, 1911.
11 SHEETS—SHEET 2.

F. H. PIERPONT.
STRIP PERFORATING AND WINDING MACHINE.
APPLICATION FILED JULY 17, 1906.

980,997.

Patented Jan. 10, 1911.

F. H. PIERPONT.
STRIP PERFORATING AND WINDING MACHINE.
APPLICATION FILED JULY 17, 1906.

980,997.

Patented Jan. 10, 1911.
11 SHEETS—SHEET 4.

Witnesses

Inventor
Frank Hinman Pierpont
By Church & Church
his Attorneys

F. H. PIERPONT.
STRIP PERFORATING AND WINDING MACHINE.
APPLICATION FILED JULY 17, 1906.

980,997.

Patented Jan. 10, 1911.
11 SHEETS—SHEET 6.

Witnesses

Inventor
Frank Hinman Pierpont
By Church & Church
his Attorneys

F. H. PIERPONT.
STRIP PERFORATING AND WINDING MACHINE.
APPLICATION FILED JULY 17, 1906.

980,997.

Patented Jan. 10, 1911.
11 SHEETS—SHEET 7.

Witnesses
Inventor
Frank Hinman Pierpont.
By Church & Church
his Attorneys

F. H. PIERPONT.
STRIP PERFORATING AND WINDING MACHINE.
APPLICATION FILED JULY 17, 1906.

980,997.

Patented Jan. 10, 1911.
11 SHEETS—SHEET 8.

Witnesses
Thomas Durant

Inventor
Frank Hinman Pierpont
By Church & Church
his Attorneys

F. H. PIERPONT.
STRIP PERFORATING AND WINDING MACHINE.
APPLICATION FILED JULY 17, 1906.

980,997.

Patented Jan. 10, 1911.
11 SHEETS—SHEET 9.

Witnesses

Inventor
Frank Hinman Pierpont
By Church & Church
his Attorneys

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

STRIP PERFORATING AND WINDING MACHINE.

980,997.  Specification of Letters Patent.  Patented Jan. 10, 1911.

Application filed July 17, 1906.  Serial No. 326,572.

*To all whom it may concern:*

Be it known that I, FRANK HINMAN PIERPONT, a citizen of the United States, temporarily residing at Horley, in the county of Surrey, England, have invented certain new and useful Improvements in Strip Perforating and Winding Machines, of which the following is a clear, full, and exact description, reference being had to the accompanying drawings, forming a part of this specification, and to the figures and letters of reference marked thereon.

The object of this invention is to provide a quick-running and efficient machine which shall form perforations in a strip of paper or like material, and wind the perforated strip into rolls each containing a predetermined length of the strip.

An important feature of the invention is the employment of the strip to give rotation to the perforating rolls, this being preferably brought about by the use of the strip as a transmitter of motion from the strip-receiving roll to the perforating rolls.

Another feature of the invention is the provision of a device to automatically stop the machine when a predetermined length of material has been wound into a roll, said device being preferably controlled by the diametric dimension of the wound roll.

Another principal feature is the provision for the delivery roll of a braking device, which is automatically put into action simultaneously with the stopping of the machine, the force with which the brake is applied being varied according to the diametric dimension of the delivery roll.

Another feature is the provision of a winding spindle capable both of rotation and of endwise movement and having a cutter adapted to engage the spool on which the strip is to be wound.

Although capable of general application, the invention is primarily intended for forming rolls of paper with feed perforations and ready to receive the control perforations to constitute record strips such as are employed to control the operation of composing and casting machines of the Lanston monotype type. A preferred construction of machine for this purpose, embodying the invention, will now be described by way of example, with reference to the accompanying drawings, of which:—

Fig. 17 is a front view.

Like reference signs indicate like parts in all the figures.

The machine frame comprises a bed plate $A^1$, which, as shown, is secured on to a bench A, or sub-base and two side plates $A^2$ $A^3$ respectively.

Figure 12:
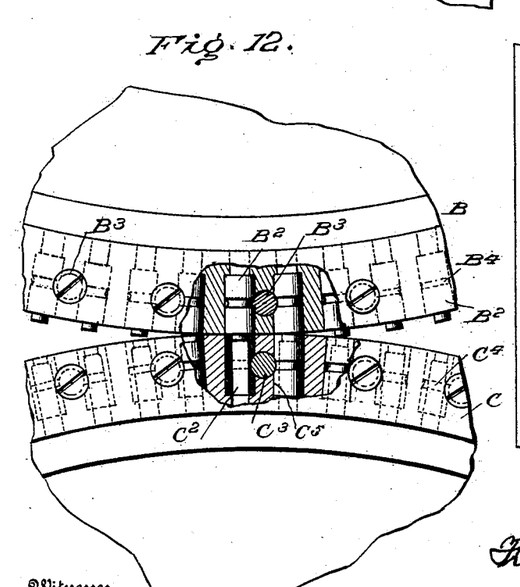

The perforating apparatus comprises two cylinders B and C, placed one above the other and adapted to rotate on spindles $B^1$, $C^1$, respectively, carried in bearings in the side plates. The upper cylinder B is provided with two series of punches $B^2$ arranged around its periphery, one series adjacent to each end of the cylinder. Preferably, each punch is an independent member, fitted into a hole bored in the cylinder and held therein by a screw pin $B^3$, which engages a groove $B^4$ on the punch body, as shown clearly in Fig. 12, one pin being utilized to engage two punches. The cylinder B may be provided with circumferential grooves $B^5$.

The lower cylinder C is provided with corresponding series of female dies $C^2$, with which the punches $B^2$ engage. Conveniently the dies $C^2$ are formed as independent cylindrical members fitted into holes $C^5$ bored in the cylinder, and held therein by pins $C^3$ and grooves $C^4$ in the same way as the punches (see Fig. 12). The holes $C^5$ are bored right through the substance of the cylinder wall, and each die cylinder $C^2$ is formed, except at the end into which the punches enter, with an internal diameter larger than the diameter of the punches so that the disks of paper punched out of the strip fall readily from the dies.

Figure 1:
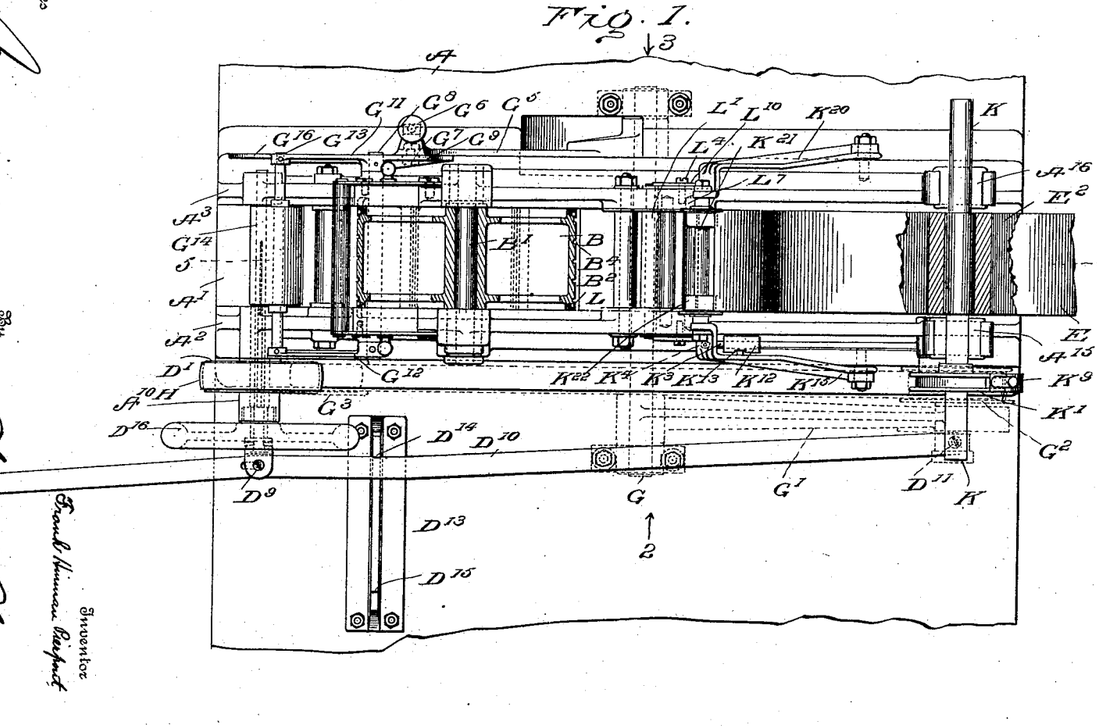
Figure 1 is a plan, part in section, of the machine.
Figure 2:
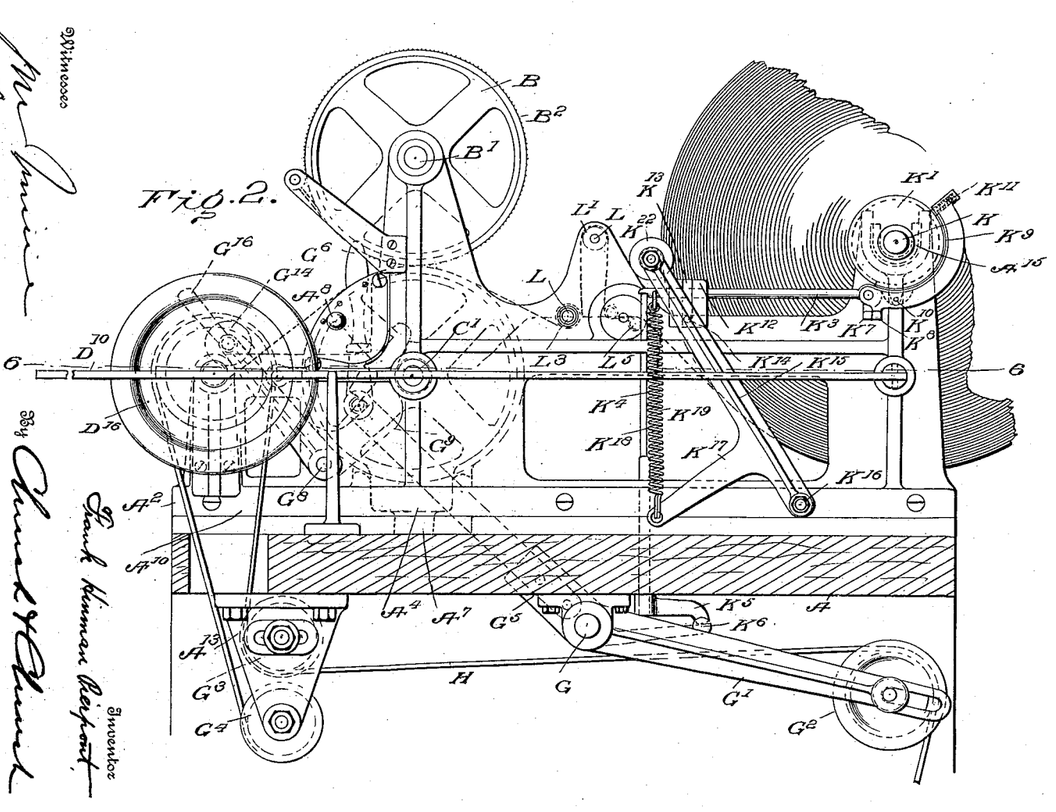
Fig. 2 is a side elevation looking in the direction of the arrow marked 2 in Fig. 1.
Figure 3:
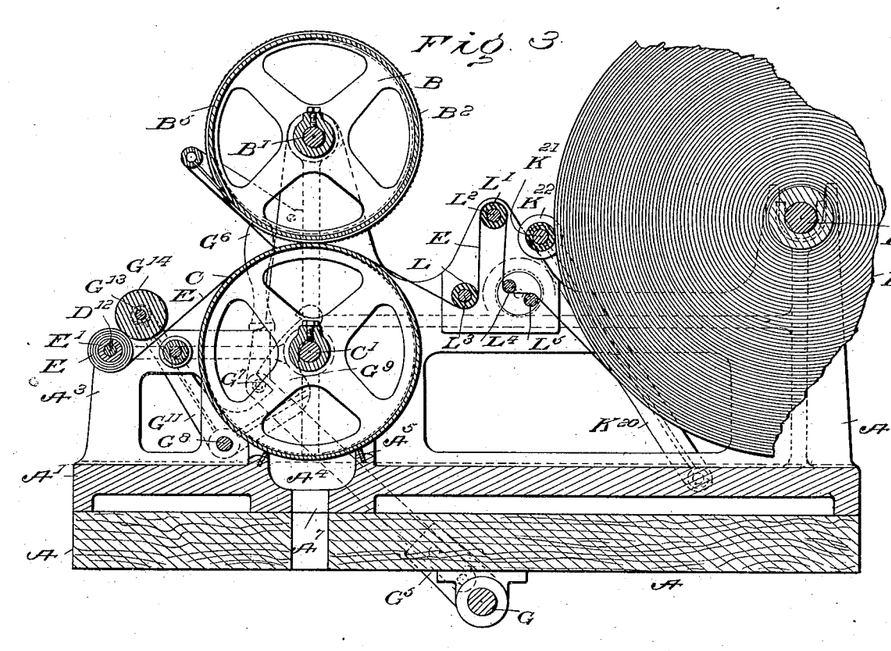
Fig. 3 is a side elevation looking in the direction of the arrow marked 3 in Fig. 1, the machine being in inoperative or idle position.
Figure 6:
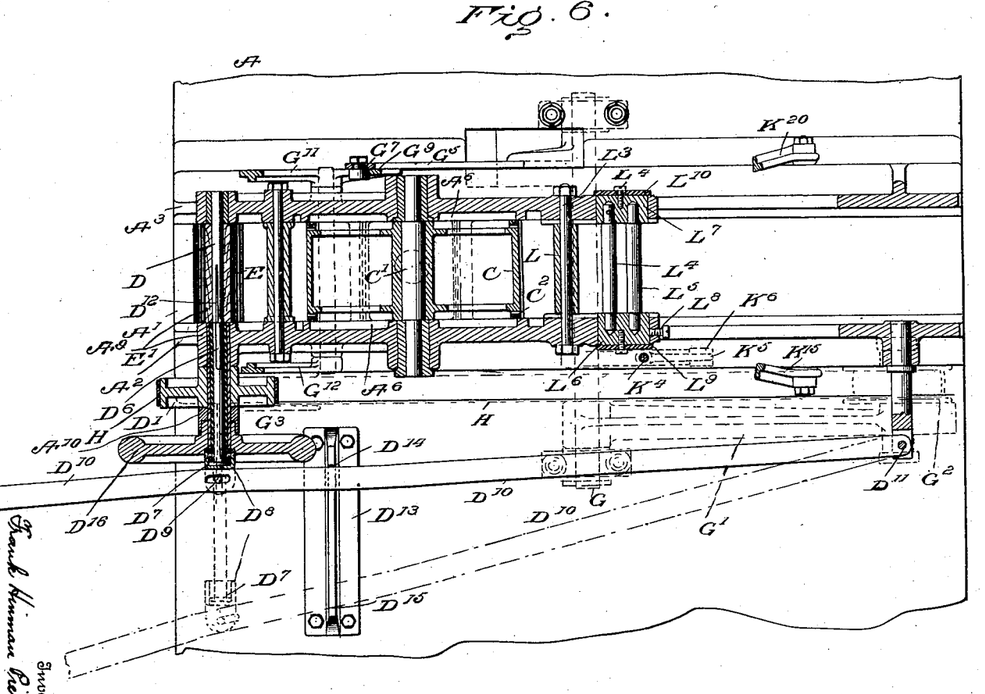
Fig. 6 is a section on the line 6—6 of Fig. 2.

In order to provide for removing this waste material from the machine the bed plate $A^1$ is provided with a recess $A^4$ immediately beneath the cylinder C, and extending across the bed plate are two ribs $A^5$, one on either side of the recess $A^4$, adapted to engage the circumference of the cylinder (see Fig. 3): the side plates $A^2$ $A^3$ abut against the ends of the cylinder C but are recessed as at $A^6$, Fig. 6, so as to form a chamber with the recess $A^4$ into which the waste falls. An opening $A^7$ in the bed plate is provided by which the chamber is connected with a suction fan, and the waste conveyed into any convenient receptacle. The ends of the cylinder C are thus shut in when the cylinder is in position in the machine and to allow therefore of a die $C^2$ being readily replaced a hand hole is provided in each of the side plates $A^2$ $A^3$. These are closed by covers $A^8$ which may be secured in place by screw studs as shown in Figs. 2 and 3.

The two cylinders B and C are placed at such a distance apart that when the strip to be perforated is placed between them and drawn forward, while it is held perfectly flat by their circumferential surfaces, it will rotate the cylinders without fear of being torn.

The paper strip is drawn through the machine and formed into a roll by direct rotation of the spool on which it is wound. A preferred construction of mechanism for this purpose is shown in Figs. 6 to 10.

Figures 7, 8, 9, 10:
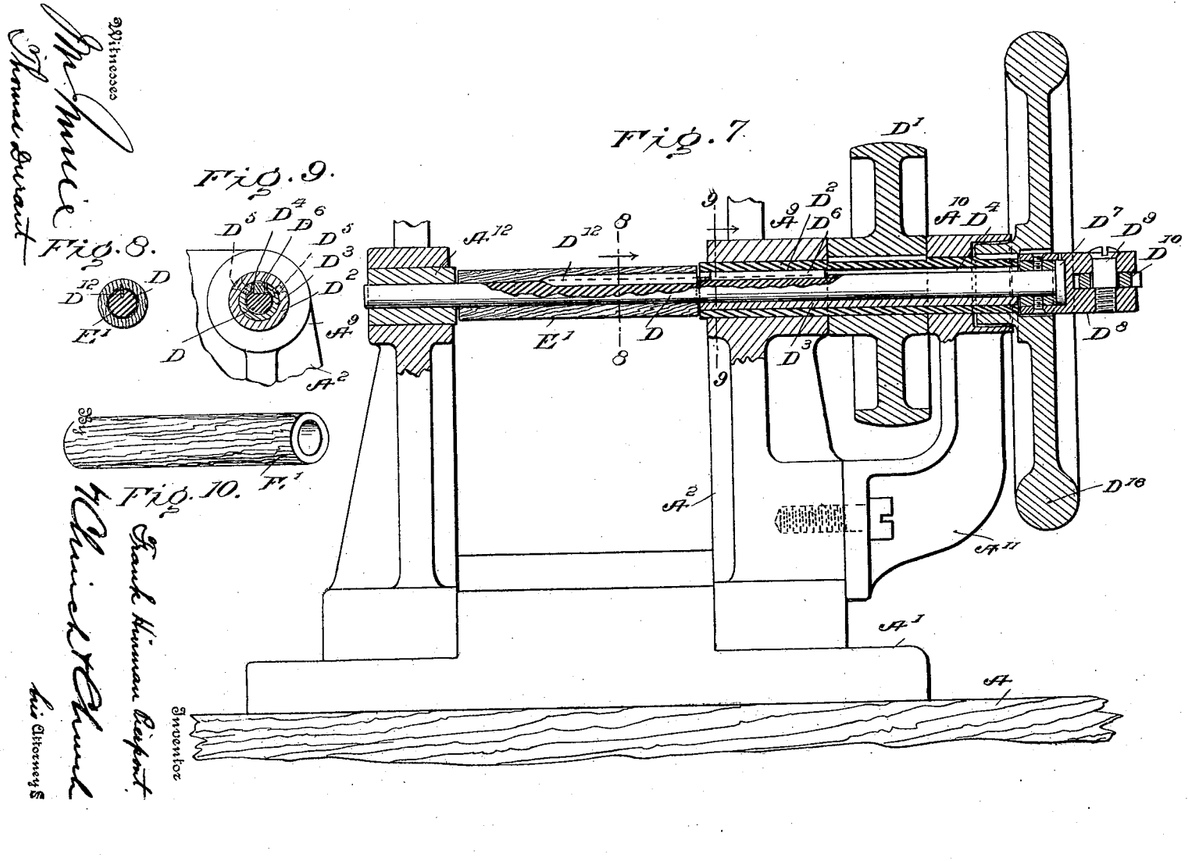
Fig. 7 is a detail on an enlarged scale illustrating the receiving-roll attaching and driving mechanism.
Fig. 8 is a section of the receiving-roll and its carrying spindle on the line 8—8 of Fig. 7.
Fig. 9 is a section on the line 9—9 of Fig. 7.
Fig. 10 is a perspective view of a receiving-roll.
Figure 11:
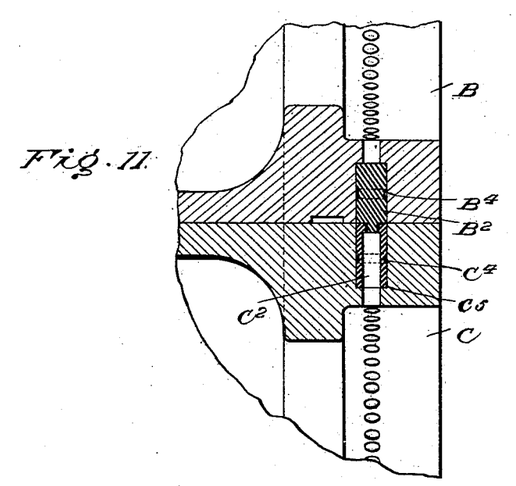
Figs. 11 and 12 are detail views showing a preferred construction of the perforating dies.

A pulley $D^1$ is fixed centrally on a sleeve $D^2$ carried rotatably in two bearings $A^9$ $A^{10}$, formed respectively in the side plate $A^2$ and in a bracket $A^{11}$ removably secured on said side plate. The pulley is arranged between the two bearings with its boss contiguous thereto so that the sleeve $D^2$ is held from endwise movement. Within the sleeve $D^2$ is a second sleeve $D^3$, having a slot or key-way $D^4$ extending throughout its whole length, and secured to the first sleeve so as to be incapable of movement relative thereto, say by screws $D^5$, as shown in Fig. 9. The sleeves $D^2$, $D^3$, are formed as separate members for constructive convenience; it is evident that as far as their function goes they might be formed integral one with the other.

A spindle D is carried within the sleeve $D^3$, and connected thereto by a key $D^6$ engaged in the slot $D^4$, so that the spindle revolves with the sleeve but is capable of endwise movement independent thereof.

One end of the spindle extends beyond the sleeve across the space between the two side plates $A^2$, $A^3$, and rests in a bearing $A^{12}$ in the latter of said plates; the other end of the spindle is provided with a collar $D^7$ engaged in a head or block $D^8$ so as to be capable of rotation but not of endwise movement independently thereof, as shown clearly in Fig. 7. The head $D^8$ is connected by a pin and slot connection $D^9$ (see Figs. 6 and 7) to an arm $D^{10}$ pivoted to a pin $D^{11}$, lug or the like, extending from the side plate $A^2$.

The portion of the spindle D which is normally between the side plates of the machine-frame is provided with a spool clutch, in this instance a knife blade $D^{12}$, extending slightly above the surface of the spindle and lying in the direction of its axis, so as to readily engage with a spool placed thereon and secure it firmly so as to rotate therewith. A preferred form of spool consisting of a wooden cylinder $E^1$ is shown detached in Fig. 10.

Conveniently a hand wheel $D^{16}$ may be keyed on to the sleeve $D^2$ to enable the operator to rotate the spindle for purposes of adjustment.

By the above described construction one spool can be quickly removed from and another secured on to the spindle. To remove a spool the operator throws the arm $D^{10}$ from the position shown in full lines in Fig. 6 into the position indicated by chain lines, withdrawing the spindle entirely from engagement with the spool. To place a new spool in position the operator holds the same in position with his left hand while with his right hand he throws the arm $D^{10}$ back into the position shown in full lines in Fig. 6. A pedestal $D^{13}$ may be provided as a support for the arm $D^{10}$, and furnished with stops $D^{14}$, $D^{15}$ to indicate the two extreme positions of the said arm.

The spindle D may be rotated by means of a belt H connecting the pulley $D^1$ with a convenient source of power.

Figure 4:
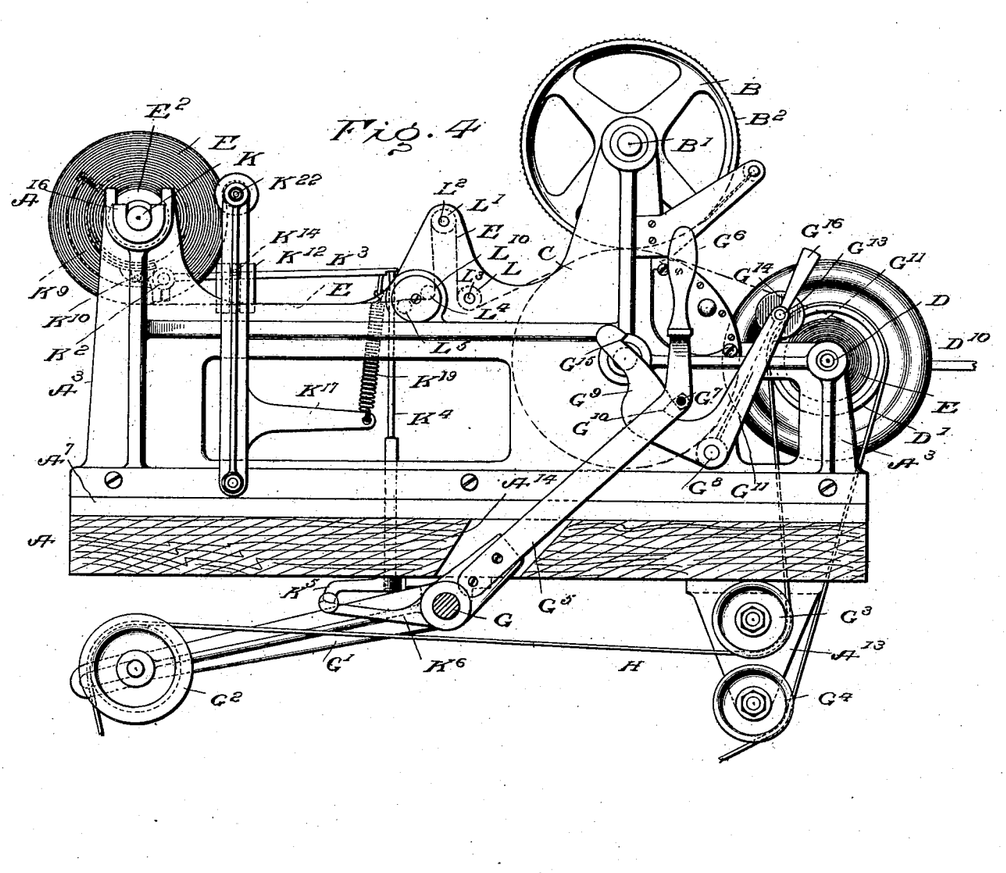
Fig. 4 is a similar view to Fig. 3, but with the machine in running position.

In order to automatically arrest the motion of the machine when a predetermined length of the strip shall have been wound on the spool the following mechanism is provided:—Carried in bearings on the under side of the bench A is a rock-shaft G. The shaft extends transversely across the center portion of the machine and has fixed on one end an arm $G^1$, which extends rearwardly and downwardly and carries a belt tightening pulley $G^2$, the arm being so positioned that the pulley $G^2$ is in the plane of spindle-pulley $D^1$. Carried one above the other on a bracket $A^{13}$ on the bench A are two idle pulleys $G^3$, $G^4$ and the driving belt H of the spindle pulley $D^1$ is carried over these two pulleys and the pulley $G^2$, as shown in Figs. 2, 3 and 4, and thence to a pulley on a convenient driving shaft. Conveniently the pulley $G^2$ is adjustably connected to the arm $G^1$, say by a slot as shown best in Fig. 2, for the purpose of taking up slack in the belt. On the opposite end of the rock-shaft G is fixed a second arm $G^5$, extending upwardly (the bench A being slotted to allow of its passage) and toward the front of the machine. It is provided with a handle $G^6$ and a stop $G^7$.

A rock-shaft $G^8$ is carried in bearings in the side plates $A^2$ $A^3$ and fixed on one end of said shaft is a bell-crank: or the shaft may be fixed and the bell-crank pivotally carried thereon. The upper edge of one arm $G^9$ of the bell-crank is slightly curved and so positioned relative to the arm $G^5$, as to engage the bottom of the stop $G^7$ and allow the same to slide over it when the arm is rocked. This edge of the bell-crank arm is provided with a step $G^{10}$, which forms a catch, adapted to engage the stop $G^7$ and lock the arm $G^5$ when the said arm is so placed that the pulley $G^2$ (the position of which is controlled by the rock shaft G and its two arms $G^1$ $G^5$) is in position to hold the belt H tight and run the machine.

Figure 5:
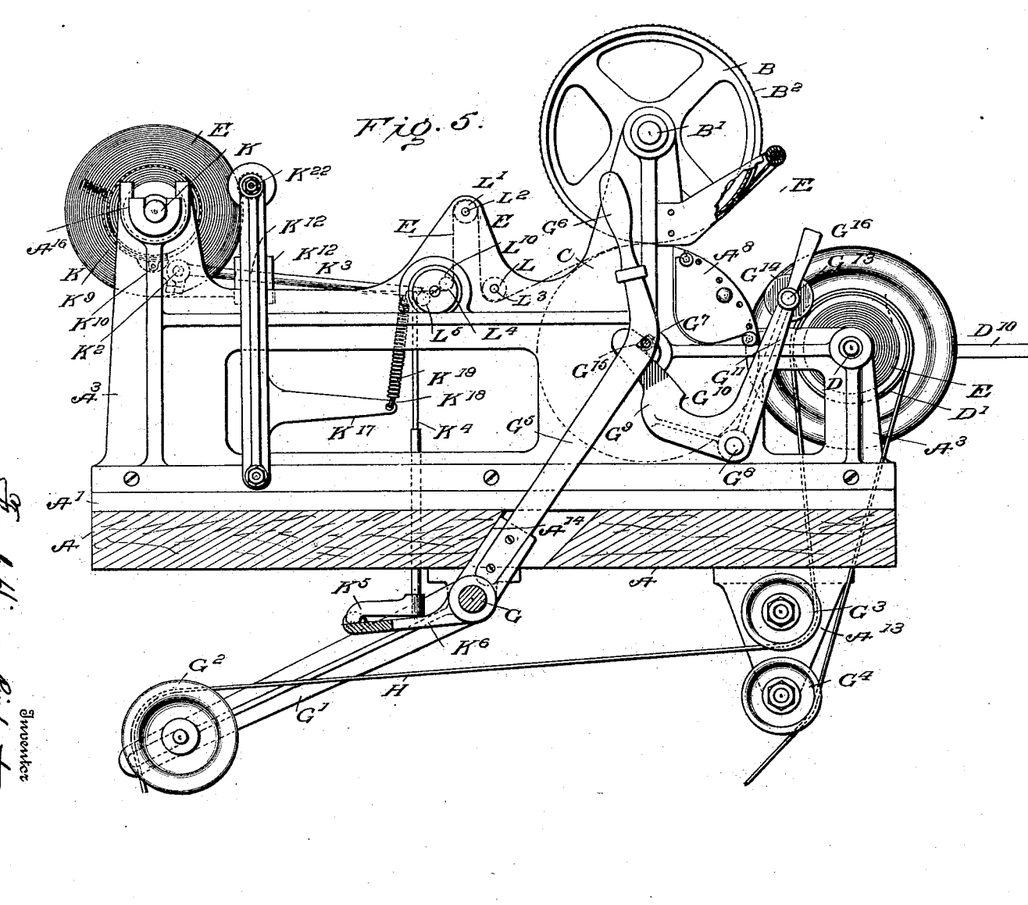
Fig. 5 is a section on the line 5—5 of Fig. 1.

In the free end of the other arm $G^{11}$ of the bell-crank is fixed one end of a spindle $G^{13}$, of which the other end is fixed in an arm $G^{12}$ secured similarly to the bell-crank on the shaft $G^8$ at the other end to that on which the bell-crank is positioned. The spindle $G^{13}$ carries a roller $G^{14}$, which is thus held parallel to and in the vicinity of the receiving spool $E^1$, so as to rest upon the surface of the paper strip E as this is wound thereon. The step $G^{10}$ must be so proportioned and arranged relatively to the stop $G^7$ that it will engage the stop and thereby hold the arm $G^5$ locked until the desired length of paper has been wound on the spool, when the increased diameter of the paper roll acting through the roller $G^{14}$ will have lowered the bell-crank arm $G^9$ and disengage the step from the stop, so that the arm $G^5$ will pass from the position shown in Fig. 4 to that shown in Fig. 5, correspondingly rocking the arm $G^1$, loosening the belt H and stopping the machine. In order to limit the rocking movement of the arms $G^1$ $G^5$ in this direction a stop is necessary. This may be a second step $G^{15}$ on the bell crank arm but preferably, to avoid undesirable shocks between the arm and the bell-crank a stop of wood or like material is provided to engage the arm, and this may be formed of one wall $A^{14}$ of the slot in the bench A through which the arm passes, as shown in Figs. 4 and 5.

A handle $G^{16}$ may be provided either on the arm $G^{12}$, or on the bell-crank arm $G^{11}$ as shown in the figures, to enable the operator at will to throw back the bell-crank, unlock the arm $G^5$ and stop the machine.

Conveniently the paper to be perforated is supplied to the machine from a large roll wound on a spool $E^2$. The spool is secured on a spindle K, say by a key, and the spindle is mounted on open bearings $A^{15}$ $A^{16}$ formed on the side plates $A^2$ $A^3$ respectively. The spindle K is prolonged on each side beyond the said bearings so as to be readily removed from and placed in position by the operator.

In order to regulate the feed of the paper strip from the delivery roll to the perforating cylinders an adjustable tension device is preferably provided. This comprises a series of preferably four parallel rollers placed between the delivery roll and the perforating cylinders. Two of these rollers L, $L^1$, are carried on spindles $L^2$, $L^3$, respectively, fixed in the side plates $A^2$ $A^3$. The ends of the other two rollers $L^4$ $L^5$ are mounted in disks $L^6$, $L^7$ carried in bearings in the side plates $A^2$, $A^3$, so as to be rotatable therein for purposes of adjustment. The disks may be provided with caps $L^9$, $L^{10}$ to hold them from endwise movement. The strip in passing from the delivery spool to the perforating cylinders is carried between the two rollers $L^4$, $L^5$, then over the roller $L^1$ and beneath the roller L. By turning the disks to vary the angle of the plane in which the axes of the rollers $L^4$ $L^5$ lie, the degree of tension put upon the strip may be readily adjusted. The disks, when set, may be held from turning by set screws $L^8$. Preferably the roller $L^4$ is fixed in the disks so as not to rotate but merely allow the strip to slide over it.

Figure 13:
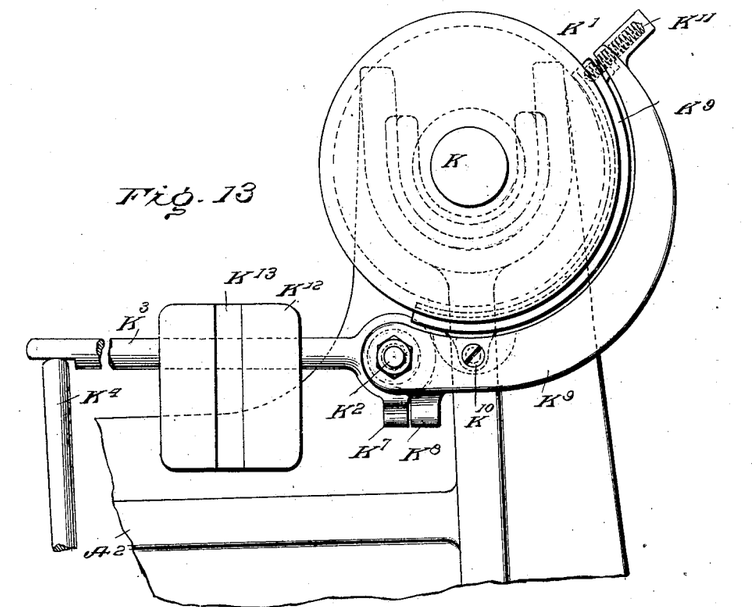
Figs. 13, 14 and 15 show details of the delivery roll spindle brake.
Figure 14:
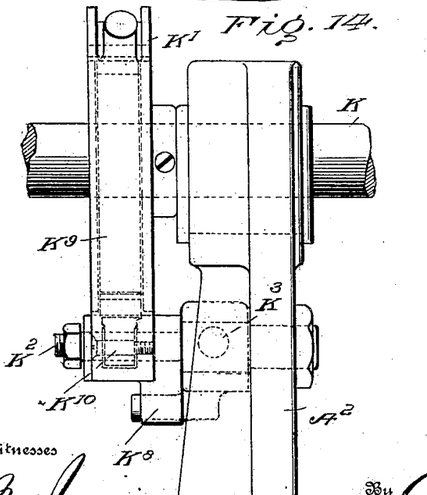
Figure 15:
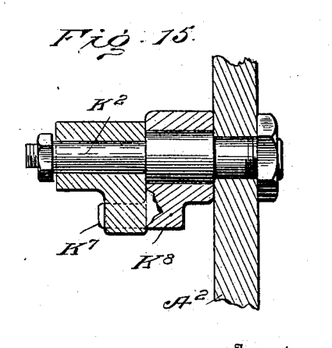
Figure 16:
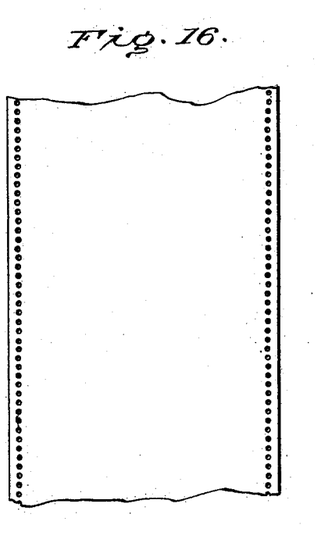
Fig. 16 shows a portion of a perforated strip.

In order to more promptly stop the machine when the belt is slackened, a brake is provided, and preferably to prevent overrunning of the delivery spool the brake is applied to the delivery spool spindle; the following is a convenient arrangement:—A small pulley $K^1$, having a flat periphery, is fixed on one end of the delivery-spool spindle K. A pin $K^2$ is fixed in the side plate $A^2$, immediately below the said pulley, and has pivotally mounted upon it the head of a horizontal rod $K^3$, of which rod the free end rests on the top of a vertical rod $K^4$, mounted so as to have endwise movement in bearings in the base plate $A^1$. The lower end of the rod $K^4$ has an arm $K^5$, of which the end is curved downwardly to rest on an arm $K^6$, fixed on the rock-shaft G, the two arms being arranged so that the rod $K^4$ holds the arm $K^5$ approximately horizontal, when the arms $G^1$ $G^5$ also carried on the said rock-shaft, as hereinbefore described, are in running position, as shown in Figs. 2 and 4. The head of the rod $K^3$ is provided with a lug $K^7$ adapted to engage a lug $K^8$ (see Figs. 13, 14 and 15) on a curved brake-arm $K^9$, pivotally carried, (by the side of the head of the rod $K^3$) on an extension of the pin $K^2$, and arranged to partially surround the periphery of the pulley $K^1$. Between this brake arm and the pulley is an inner brake arm $K^{9a}$, of which one end is pivoted at $K^{10}$ to the outer arm, while the other end is lightly held against the surface of the pulley by a spring $K^{11}$, as shown in Fig. 13. A weight $K^{12}$ is provided in the arm $K^3$. By this construction so soon as the shaft G has been rocked by the arm $G^5$ to lower the pulley $G^2$ and slack the driving belt, the rod $K^4$ is lowered, and the rod $K^3$ swings on its pivot-pin into the position shown in Fig. 3, and its lug $K^7$ engaging the lug $K^8$ applies the brake $K^{9a}$ to the rim of the delivery spindle pulley. The force with which the brake is applied depends on the heaviness of the weight $K^{12}$ and the leverage given it by its position on the rod $K^3$.

Since the power required to stop the rotation of the delivery spool will vary according to the diametric size of the roll, and the machine may require to be stopped, when varying quantities of strip are on the delivery spool, it is desirable to be able to vary the force with which the brake is applied as the diameter of the roll varies and in order to do this automatically the weight $K^{12}$ is adapted to slide along the rod $K^3$ and is provided with a slot $K^{13}$, in which slot is engaged a pin $K^{14}$ carried on an arm $K^{15}$ pivoted at $K^{16}$ to the side plate $A^2$. In the free end of the arm is fixed one end of a spindle $K^{21}$, of which the other end is supported by an arm $K^{20}$, corresponding to the arm $K^{15}$ and pivoted in the standard $A^3$. On each end of the spindle $K^{21}$ is a flanged roll $K^{22}$, adapted to engage an edge of the delivery roll on both the periphery and the sides of the same. These rolls are held constantly in contact with the delivery roll by means of a spring or springs, and by thus following the surface of the delivery roll cause their supporting arm $K^{15}$ to control the position of the brake weight and regulate the tension exerted by the brake according to the diametric dimension of the roll.

In the machine now being described, the rolls are held in contact with the delivery roll by means of springs $K^{18}$, $K^{19}$, connected to the rod $K^3$ and an arm $K^{17}$ projecting from the arm $K^{15}$ as shown best in Fig. 2. This arrangement of the springs constitutes a second device for regulating the power exerted by the brake according to the diametric diameter of the delivery roll, and may be employed, as in the machine now being described, in conjunction with the first described device, or either device might be employed alone.

Figure 17:
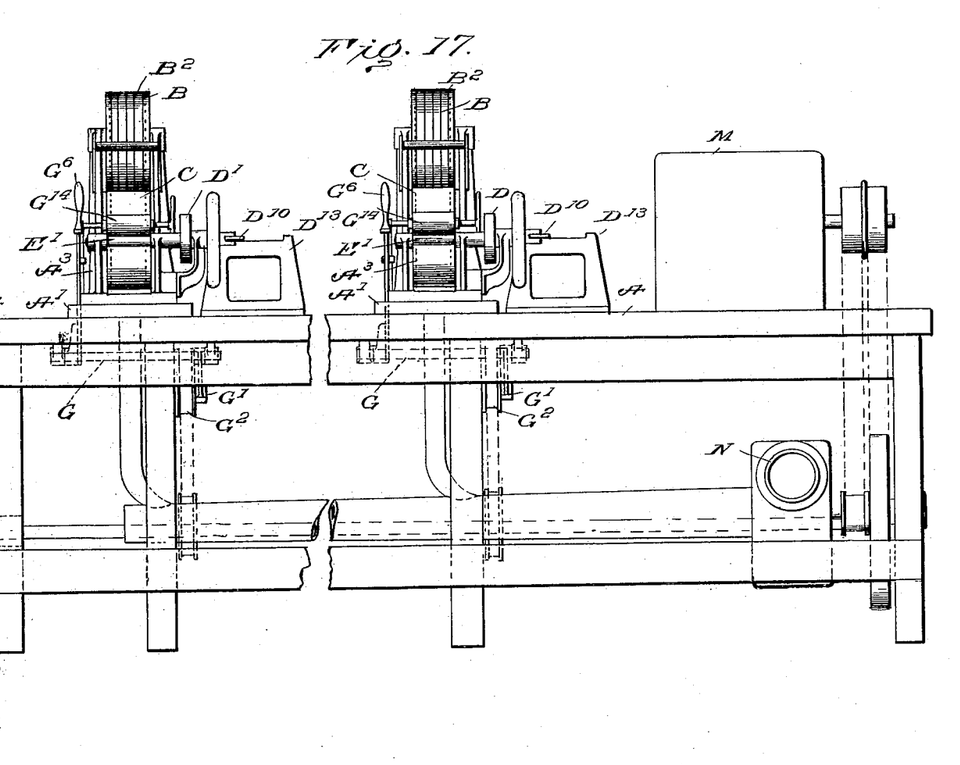
Figure 18:
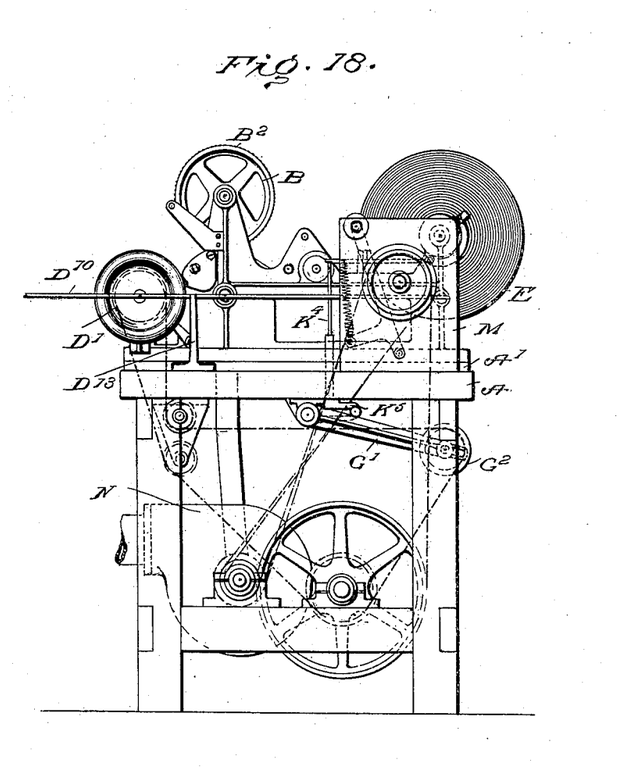
Fig. 18 a side view illustrating a convenient arrangement of two or more machines with a common source of motive power and a common waste remover.

Conveniently two or more machines may be arranged side by side, as shown in Figs. 17 and 18, a blower N, common to all, being provided to remove the waste cut out by the punches, the blower as well as the perforating machines being operated by an electric motor M.

Having thus described my invention, what I claim as new and desire to secure by Letters Patent, is:—

1. In a machine for winding strip material the combination with a rotating strip-winding spindle and driving mechanism therefor comprising a belt-tightening pulley carried on an arm of a rock-shaft, of a second arm on the rock-shaft having a stop, a catch adapted to engage the stop and lock the arm when the pulley is in operative position, and a device controlled by the diametric dimension of the roll wound on the spindle to move the catch and release the stop, substantially as described.

2. In a machine for winding strip material the combination with a brake for the strip-delivering roll, of a device to automatically apply the brake simultaneously with the stoppage of the driving gear of the machine, and a device to automatically vary the power of the brake according to the diametric dimension of the roll at the time the brake is applied.

3. In a machine for winding strip material a spring or a weight connected with a brake lever, and, as to the turning moment it exerts on said lever, controlled automatically by a member pressed against the material on a strip-carrying roll, in order that the braking effort shall be proportional to any diameter the roll of material may have assumed by the time that the brake is actuated.

4. In a strip perforating machine provided with delivery and winding rolls and in combination therewith a pair of freely rotating perforating rolls located intermediate said delivery and winding rolls in the line of travel of the strip, said perforating rolls provided with a circumferential series of punches, complemental dies and opposing gripping surfaces, whereby as the strip is advanced it will communicate motion to the rolls.

5. In a strip perforating machine the combination of the following elements, to wit; a strip feeding mechanism; a supply spool or delivering roll; and a pair of freely revolving perforating rolls, the one provided with two circumferential series of punches and intermediate gripping surface and the other provided with complemental dies and gripping surface.

6. In a strip perforating machine provided with freely rotating perforating rolls adapted to receive motion from the strip during its passage between them and in combination therewith a power driven feeding mechanism engaging the strip to advance the latter, a delivery roll and tension devices intermediate the delivery roll and perforating rolls.

7. In a strip feeding or winding mechanism the combination with a rotary sleeve, of a winding spindle connected to rotate with said sleeve but free to reciprocate longitudinally therein and provided with an incising member adapted to engage a spool when entered therein.

8. In a strip feeding or winding mechanism the combination of the following elements, to wit: two alined bearings, a sleeve mounted in one of said bearings; and a longitudinally reciprocating winding spindle mounted in said sleeve and adapted to enter the opposite bearing, said spindle being coupled to rotate with the sleeve and provided with a radially projecting incising member.

9. In a strip feeding or winding mechanism the combination of the following elements, to wit: separated and alined bearings; a driven sleeve supported in one of said bearings and provided with a longitudinal groove; and a longitudinally adjustable spindle provided with a key and an incising member in alinement therewith, said spindle extending through the sleeve in position to enter the bearing opposite thereto.

10. In a strip feeding or winding mechanism the combination of the following elements, to wit: separated and alined bearings; a driven sleeve in one of said bearings provided with an internal longitudinal groove; a winding spindle mounted in said sleeve and provided with a key and an incising blade in alinement therewith; and means coupled with said spindle for reciprocating the same.

11. In a machine for winding strip material provided with a strip delivering roll and a driven winding roll and in combination therewith means controlled by the accumulation of material on the winding roll for disconnecting the latter from its driver, and a brake for the delivering roll coupled with said driver control means to automatically apply the brake when the winding roll is disconnected.

12. In a winding mechanism for strip perforating machines and the like the combination of the following elements, to wit: a delivery roll provided with a brake; a winding roll provided with releasable driving mechanism; means controlled by the accumulation of material on the winding roll for simultaneously disconnecting the driving mechanism and applying the brake to the delivery roll.

13. In a winding mechanism for strip perforating and like machines the combination of the following elements, to wit: a winding roll provided with detachable driving devices and automatic disconnecting means controlled by the accumulated material on said winding roll; a delivering or supply roll; a braking device for said delivery roll provided with a motor and detent or restraining means; and a releasing mechanism for said brake motor devices coupled with the automatic disconnecting means of the winding spool driver.

14. In a strip delivering mechanism for perforating and like machines, the combination of a delivering roll provided with a braking wheel or disk, a brake shoe, a motor for operating said brake shoe, a restraining device for said motor, and means for varying the power or stress of the motor.

15. In a strip delivering mechanism for perforating and like machines the combination of the following elements, to wit: a delivering roll; a brake for said roll provided with applying means; and means controlled by the diametric dimensions of the material contained upon said delivery roll for automatically varying the power of said brake applying means.

16. In a strip delivering mechanism for perforating and like machines, the combination of the following elements, to wit: a delivery roll; a brake mechanism for said roll provided with power applying devices; and automatic means for varying said power applying devices to accord with the dimensions of the roll.

17. In a strip perforating mechanism the combination of the following elements, to wit; a delivering roll; a pair of freely revolving perforating rolls adapted to be driven by the strip; a winding roll; and a brake mechanism for the delivering roll provided with variable power actuating means under the control of the material on the delivering roll.

18. In a brake mechanism for the delivering roll of perforating and like machines, the combination of the following elements, to wit; a brake wheel coupled with the roll; a pivoted brake shoe; a lever coupled with the brake shoe for applying the latter; a motor device coupled with the lever; and means for varying the power of said motor device proportionally to the diametric dimensions of the delivering roll.

19. In a brake mechanism for the delivery roll of perforating and like machines the combination of the following elements, to wit; a brake wheel; a pivoted shoe; an actuating lever engaging said shoe to apply it to the brake wheel; a weight movable upon the actuating lever; and a control member coupled with said weight and engaging the periphery of the roll of material.

20. In a brake mechanism for the delivery roll of perforating and like machines the combination of the following elements, to wit; a brake wheel coupled with the shaft of the delivering roll; a brake shoe; a lever for said brake shoe; a motor device engaging said lever and a pivoted control member for said motor device arranged to engage the periphery of the roll of material.

21. In a strip perforating machine provided with delivering and winding spools and intermediate perforating mechanism and in combination therewith the following elements, to wit; a driving mechanism for the winding spool provided with disconnecting means; a lever coupled with said disconnecting means; a retaining latch engaging said lever and controlled by a member contacting with the roll of material on the winding spool to trip said latch; a brake mechanism for the delivering spool provided with actuating devices; means for suspending the application of the brake; and means for transmitting motion from the disconnecting means of the winding spool driving mechanism to said suspending means.

22. In a strip perforating mechanism provided with perforating rolls and winding and delivering spools and in combination therewith, the following elements, to wit; a driving mechanism for the winding spool including a movable pulley, an actuating arm or lever and a retaining device, the latter automatically controlled by a member contacting with the material wound upon the spool; a brake mechanism for the delivering spool including a pulley, brake shoe, actuating lever and motor device; and means coupled with the movable pulley of the winding spool driving mechanism for controlling the application of said motor device to the brake shoe.

23. In a strip perforating machine the combination with a cylinder provided with a plurality of radial perforations or sockets and punches located therein, of a locking pin inserted between and engaging adjacent punches to retain them in position.

24. In a strip perforating machine such as described, the combination with a pair of perforating rolls supported to turn freely in their bearings and strip feeding devices engaging the strip on the delivery side of the rolls and operating through the strip to convey motion to said rolls.

FRANK HINMAN PIERPONT.

Witnesses:
EUSTACE H. BURKE,
JOHN J. NEWPORT.